(12) United States Patent
Foster

(10) Patent No.: US 7,155,791 B1
(45) Date of Patent: Jan. 2, 2007

(54) CONNECTING ROD CAP SEPARATOR SYSTEM

(76) Inventor: John R. Foster, 686 New England Rd., Searsmont, ME (US) 04973

( * ) Notice: Subject to any disclaimer, the term of this patent is extended or adjusted under 35 U.S.C. 154(b) by 499 days.

(21) Appl. No.: 10/761,730

(22) Filed: Jan. 21, 2004

(51) Int. Cl.
*B23P 19/04* (2006.01)

(52) U.S. Cl. ............................. 29/239; 29/270; 29/278

(58) Field of Classification Search ................. 29/239, 29/241–242, 270, 278, 238; 81/60
See application file for complete search history.

(56) References Cited

U.S. PATENT DOCUMENTS

| | | | | |
|---|---|---|---|---|
| 4,292,833 A | * | 10/1981 | Lapp | 72/416 |
| 5,893,306 A | * | 4/1999 | Owoc | 81/60 |
| 6,116,118 A | * | 9/2000 | Wesch, Jr. | 81/57.34 |

* cited by examiner

*Primary Examiner*—Lee D. Wilson
(74) *Attorney, Agent, or Firm*—Edward P. Dutkiewicz

(57) ABSTRACT

A connecting rod cap separator system comprising a housing having a pair generally side components each with an inside face and an outside faces adapted to fit inside the circular aperture of a connecting rod; a pair of support screws; an activation shaft with a threading and a crank lever; and a pair displacing wedges each having a pair of sloped faces and apertures extending there through. The apertures are adapted to receive the activation shaft such that when the activation shaft is rotated by the crank lever in one direction, threading of a displacing wedge draw the wedges closer together thereby displacing the side components of the housing outwardly to an expanded state, and when the activation shaft is rotated by the crank lever in the opposite direction, threading of a displacing wedge expands the wedges away from each other thereby contracting the side components of the housing inwardly to the contracted state.

4 Claims, 3 Drawing Sheets

CONNECTING ROD CAP SEPARATOR SYSTEM

BACKGROUND OF THE INVENTION

1. Field of the Invention

The present invention relates to a connecting rod cap separator system and more particularly pertains to displacing a rod cap from an associated main beam of a connecting rod.

2. Description of the Prior Art

The use of automotive tools is known in the prior art. More specifically, automotive tools previously devised and utilized for the purpose of repairing vehicles are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 6,505,598 issued to Donais on Jan. 14, 2003 and relates to a connecting rod assembly for internal combustion engine. U.S. Pat. No. 4,970,783 issued to Olaniran et al on Nov. 20, 1990 and relates to a method of making split remateable connecting rod portions. Lastly, U.S. Pat. No. 5,051,232 issued to Summers on Sep. 24, 1991 for a powdered metal multiple piece component manufacturing. While these devices fulfill their respective, particular objectives and requirements, the aforementioned patents do not describe a connecting rod cap separator system that allows displacing a rod cap from an associated main beam of a connecting rod.

In this respect, the connecting rod cap separator system according to the present invention substantially departs from the conventional concepts and designs of the prior art, and in doing so provides an apparatus primarily developed for the purpose of displacing a rod cap from an associated main beam of a connecting rod.

Therefore, it can be appreciated that there exists a continuing need for a new and improved connecting rod cap separator system which can be used for displacing a rod cap from an associated main beam of a connecting rod. In this regard, the present invention substantially fulfills this need.

SUMMARY OF THE INVENTION

In view of the foregoing disadvantages inherent in the known types of automotive tools now present in the prior art, the present invention provides an improved connecting rod cap separator system. As such, the general purpose of the present invention, which will be described subsequently in greater detail, is to provide a new and improved connecting rod cap separator system and method which has all the advantages of the prior art and none of the disadvantages.

To attain this, the present invention essentially comprises a connecting rod cap separator system for displacing a rod cap from an associated main beam of a connecting rod. The system comprises, in combination, a connecting rod having a main beam and a rod cap with a circular aperture formed between the main beam and rod cap. A rectilinear housing has a pair of generally symmetrical side components including a first side component and second side component. Each side component has an adjacent inside face, an opposed outside face, a top face, a bottom face, a pair of contact indentations, an inner tapered recess and outer tapered recess with a shaft aperture running there through. Each side component has a pair of coaxial bores running through the outside face of the first side component and continuing on perpendicular to the aperture of the housing and between the inner tapered recess and outer tapered recess of the both side components. The housing is adapted to fit inside the circular aperture of the connecting rod.

A pair of support screws is adapted to be positioned in the coaxial bores of the housing to allow the symmetrical sides of the housing to move in a linear fashion toward each other when in a collapsed state and away from each other when in an expanded state.

An activation shaft is comprised of a solid generally cylindrical shaft with a continuous threading along the entire extent. The shaft has an inner end and an outer end and with a crank lever coupled to the inner end to apply rotational energy to the activation shaft during operation and use.

A pair of displacing wedges include an inner wedge and an outer wedge. Each wedge has a pair of sloped faces, an exterior face, an interior face, a thrust bearing and threaded apertures extending between the exterior face and the interior face. The outer wedge is threaded. The inner wedge is unthreaded. The sloped faces are adapted to lie in sliding contact against the inner tapered recess and the outer tapered recess of the housing. The apertures are adapted to receive the activation shaft. When the activation shaft is rotated by the crank lever in one direction, the threading of the displacing wedge draw the wedges closer together thereby displacing the side components of the housing outwardly to the expanded state. When the activation shaft is rotated by the crank lever in the opposite direction, the threading of the displacing wedge expands the wedges away from each other thereby contracting the side components of the housing inwardly to the contracted state. The thrust bearing reduces normal friction during operation and use.

A pair of springs is coupled to the adjacent inside faces of the side components of the housing. The springs are adapted to reconfigure the system to its collapsed state as the displacing wedges are back off of each other.

Four plastic rods of a cylindrical configuration are coupled coaxially with the contact indentations of the side components of the housing. The rods are adapted to provide a non-marring contact surface to prevent damage to the connecting rod during operation and use.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved connecting rod cap separator system which has all of the advantages of the prior art automotive tools and none of the disadvantages.

It is another object of the present invention to provide a new and improved connecting rod cap separator system which may be easily and efficiently manufactured and marketed.

It is further object of the present invention to provide a new and improved connecting rod cap separator system which is of durable and reliable constructions.

An even further object of the present invention is to provide a new and improved connecting rod cap separator system which is susceptible of a low cost of manufacture with regard to both materials and labor, and which accordingly is then susceptible of low prices of sale to the consuming public, thereby making such connecting rod cap separator system economically available to the buying public.

Even still another object of the present invention is to provide a connecting rod cap separator system for displacing a rod cap from an associated main beam of a connecting rod.

Lastly, it is an object of the present invention to provide a new and improved connecting rod cap separator system. The system comprises a housing having a pair of side components each with an inside face and an outside faces adapted to fit inside the circular aperture of a connecting rod; a pair of support screws; an activation shaft with a threading and a crank lever; and a pair displacing wedges each having a pair of sloped faces and apertures extending there through. The apertures are adapted to receive the activation shaft such that when the activation shaft is rotated by the crank lever in one direction, threading of the displacing wedge draws the wedges closer together thereby displacing the side components of the housing outwardly to an expanded state. When the activation shaft is rotated by the crank lever in the opposite direction, threading of the displacing wedge expands the wedges away from each other thereby contracting the side components of the housing inwardly to the contracted state.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter, specification and claims, in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
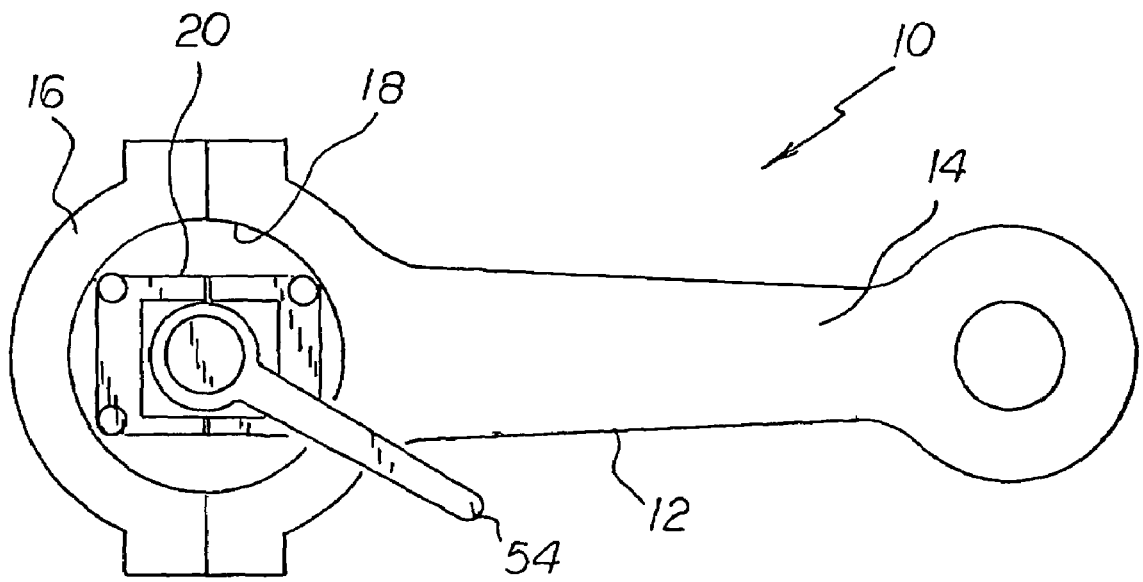
FIG. 1 is a front elevational view of a connecting rod cap separator system constructed in accordance with the principles of the present invention.
Figure 2:
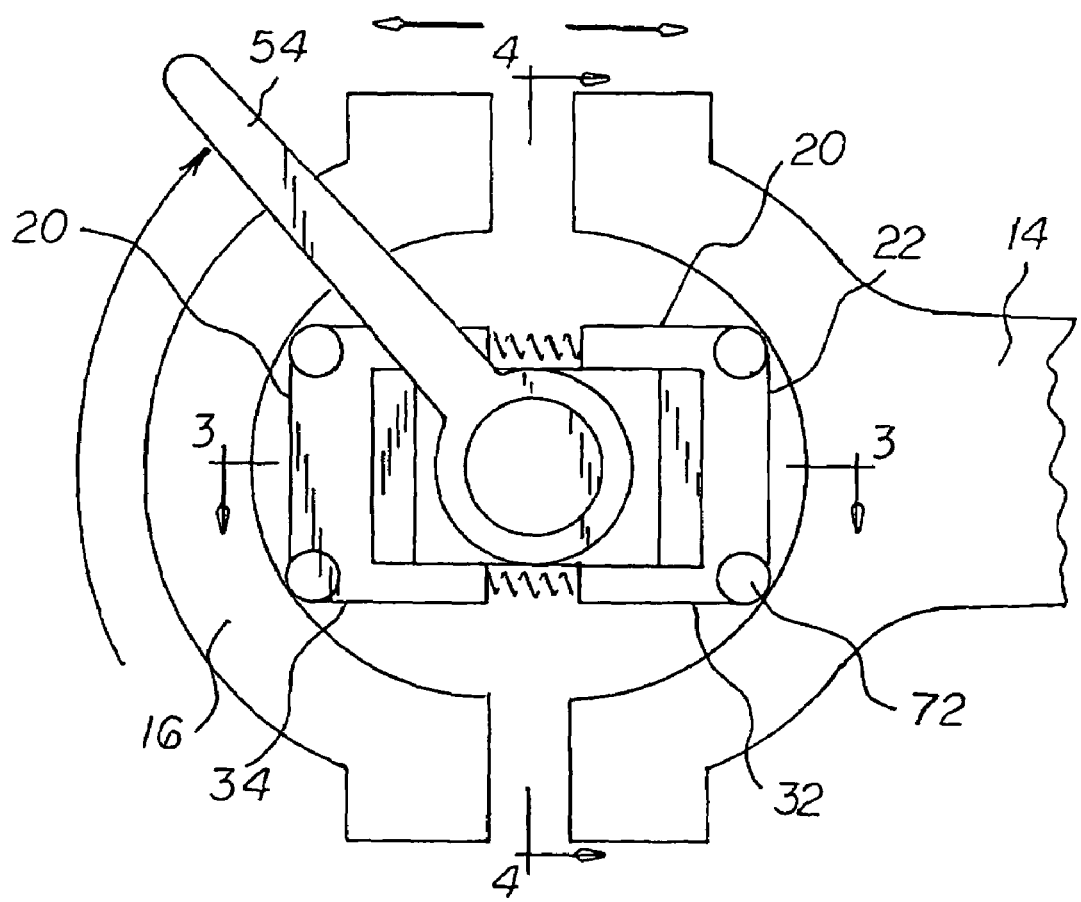
FIG. 2 is an enlarger front elevational view of the system shown in FIG. 1 but in the expanded state for separating a rod cap from a main beam of a connecting rod.
Figure 3:
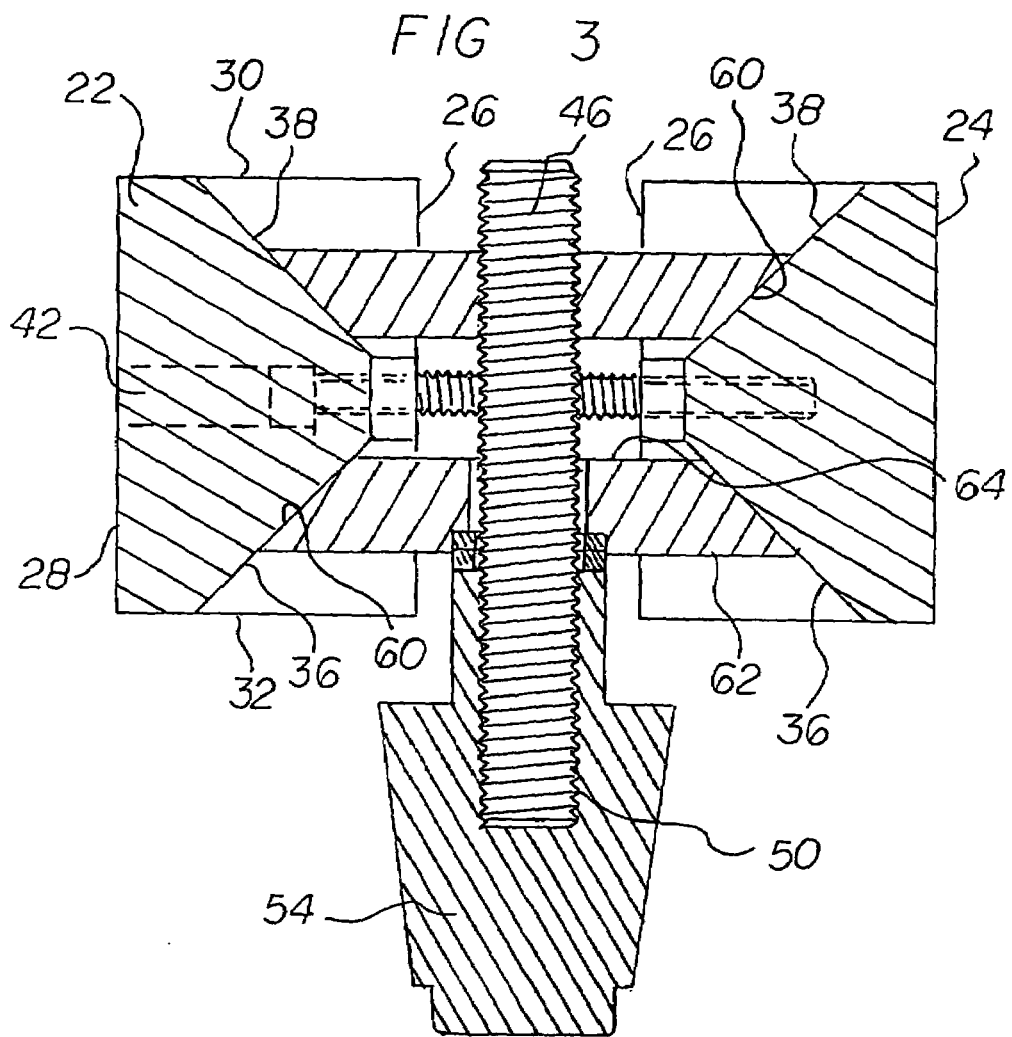
FIG. 3 is a cross sectional illustration of the present invention taken along line 3—3 of FIG. 2.
Figure 4:
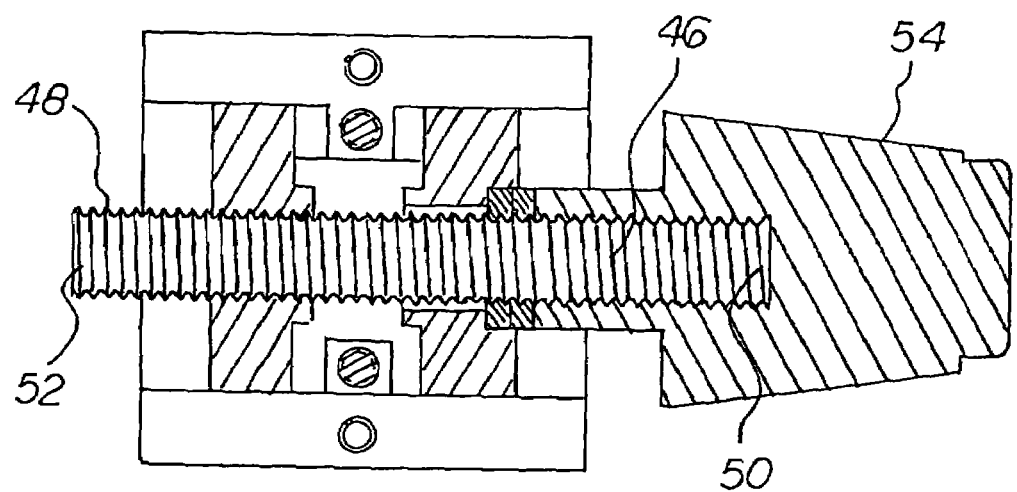
FIG. 4 is a cross sectional illustration of the present invention taken along line 4—4 of FIG. 2.
Figure 5:
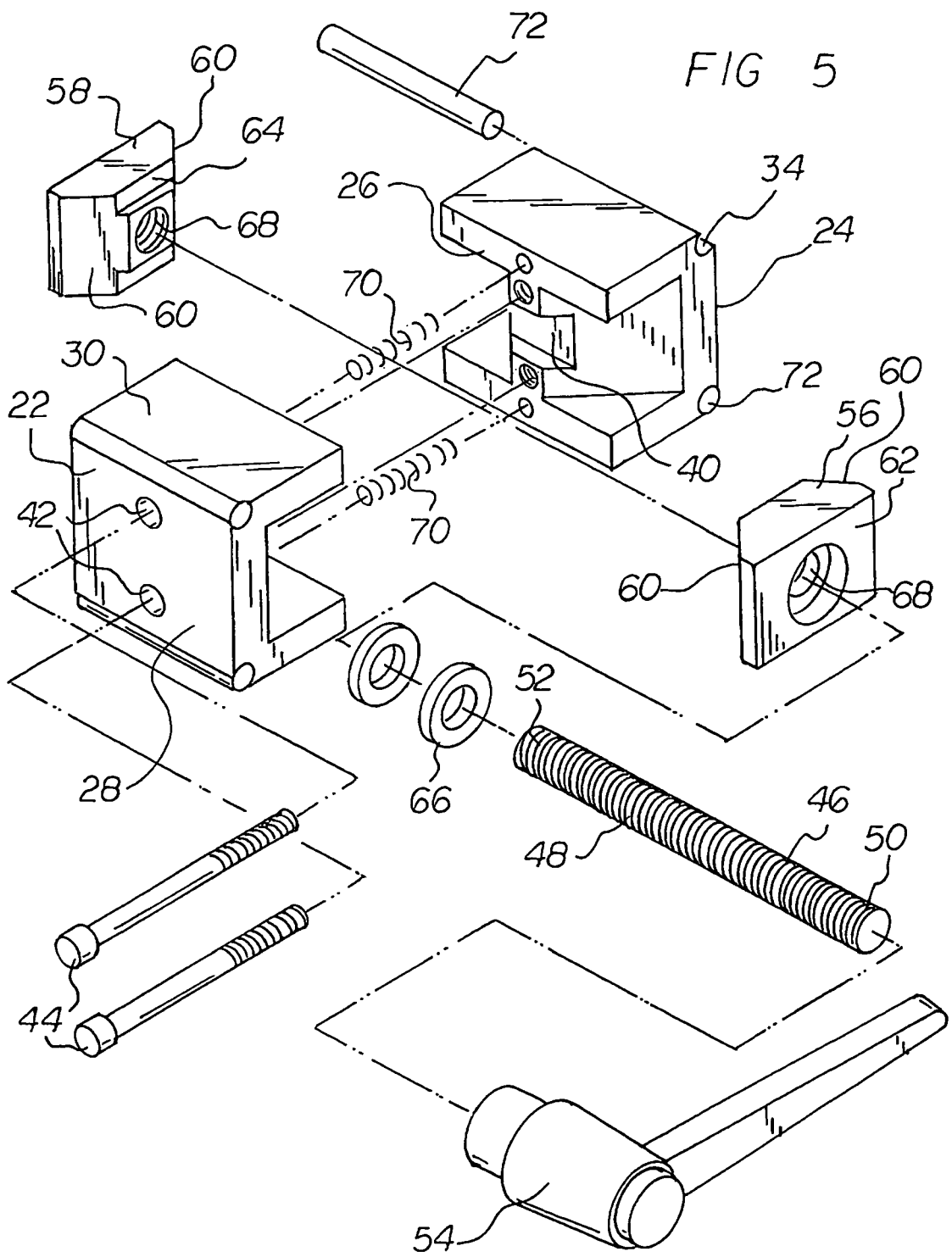
FIG. 5 is an exploded perspective illustration of the present invention showing all the components of the present invention and their relation to each other.

With reference now to the drawings, and in particular to FIG. 1 thereof, the preferred embodiment of the new and improved connecting rod cap separator system embodying the principles and concepts of the present invention and generally designated by the reference numeral 10 will be described.

The present invention, the connecting rod cap separator system 10, is comprised of a plurality of components. Such components in their broadest context include a housing, support screws, an activation shaft and displacing wedges. Such components are individually configured and correlated with respect to each other so as to attain the desired objectives.

More specifically, the present invention includes a connecting rod cap separator system 10. The system functions for displacing a rod cap from an associated main beam of a connecting rod. The system comprises, in combination, a connecting rod 12. The connecting rod has a main beam 14 and a rod cap 16 with a circular aperture 18 formed between the main beam and rod cap.

Next provided is a rectilinear housing 20. Such housing has a pair generally symmetrical side components including a first side component 22 and second side component 24. Each side component has an adjacent inside face 26, an opposed outside face 28, a top face 30, a bottom face 32, a pair of contact indentations 34, an inner tapered recess 36 and outer tapered recess 38. A shaft aperture 40 runs there through. Each side component has a pair of coaxial bores 42 running through the outside face of the first side component and continuing on perpendicularly to the aperture of the housing and between the inner tapered recess and outer tapered recess of the both side components. The housing is adapted to fit inside the circular aperture of the connecting rod.

A pair of support screws 44 is next provided. The screws are adapted to be positioned in the coaxial bores of the housing. The function is to allow the symmetrical sides of the housing to move in a linear fashion toward each other when in a collapsed state and away from each other when in an expanded state.

Provided next is an activation shaft 46. Such shaft is comprised of a solid generally cylindrical shaft with a continuous threading 48 along the entire extent. The shaft has an inner end 50 and an outer end 52. A crank lever 54 is coupled to the inner end to apply rotational energy to the activation shaft during operation and use.

A pair of displacing wedges is provided next. The pair includes an inner wedge 56 and an outer wedge 58. The inner wedge is unthreaded. The outer wedge is threaded. Each wedge has a pair of sloped faces 60, an exterior face 62, an interior face 64, a thrust bearing 66 and a threaded aperture 68 extending between the exterior face and the interior face. The sloped faces is adapted to lie in sliding contact against the inner tapered recess and the outer tapered recess of the housing. The apertures are adapted to receive the activation shaft. When the activation shaft is rotated by the crank lever in one direction, the threading of the displacing wedge draw the wedges closer together thereby displacing the side components of the housing outwardly to the expanded state. When the activation shaft is rotated by the crank lever in the opposite direction, the threading of the displacing wedge expands the wedges away from each other thereby contracting the side components of the housing inwardly to the contracted state. The thrust bearing reduces normal friction during operation and use.

The major components of the system such as the housing and the wedges are preferably constructed of metal such as steel or aluminum and fabricated by investment casting or die casting.

Next provided is a pair of springs 70. The springs are coupled to the adjacent inside faces of the side components of the housing. The springs are adapted to reconfigure the system to its collapsed state as the displacing wedges are backed off of each other.

Lastly provided are four plastic rods 72 of a cylindrical configuration. Such rods are coupled coaxially with the contact indentations of the side components of the housing. Such rods are adapted to provide a non-marring contact surface to prevent damage to the connecting rod during operation and use. A preferred material is Delrin™. Delrin is a trademark of E. I. Du Pont De Nemours and Company of Deleware and relates to synthetic resinous plastic material in the form of powders for further use in the industrial arts.

The system is preferably constructed to fit a connecting rod aperture 18 with a diameter of any of three sizes. The systems thus may be of any of a plurality of sizes to have, for example, a working range of 1.5 to 2 inches, 2 to 2.5 inches and 2.5 to 3 inches. Each sized system has, preferably, a travel range of about 0.5 inches.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new and desired by Letters Patent of the United States is as follows:

1. A connecting rod cap separator system comprising, in combination:

a connecting rod having a main beam and a rod cap with a circular aperture formed between the main beam and rod cap:

a rectilinear housing having a pair generally symmetrical side components including a first side component and second side component, each side component having an adjacent inside face, an opposed outside face, a top face, a bottom face, a pair of contact indentations, an inner tapered recess and outer tapered recess with a shaft aperture running there through, each side component have a pair of coaxial bores running through the outside face of the first side component and continuing on perpendicular to the aperture of the housing and between the inner tapered recess and outer tapered recess of the both side components, the housing being adapted to fit inside the circular aperture of the connecting rod;

a pair of support screws adapted to be positioned in the coaxial bores of the housing to allow the symmetrical sides of the housing to moving in a linear fashion toward each other when in a collapsed state and away from each other when in an expanded state;

an activation shaft comprised of a solid generally cylindrical shaft with a continuous threading along the entire extent and having an inner end and an outer end and with a crank lever coupled to the inner end to apply rotational energy to the activation shaft during operation and use;

a pair of displacing wedges including an inner wedge and an outer wedge, each wedge having a pair of sloped faces, an exterior face, an interior face, a thrust bearing and apertures extending between the exterior face and the interior face, the aperture of the outer wedge being threaded, the aperture of the inner wedge being unthreaded, the sloped faces being adapted to lie in sliding contact against the inner tapered recess and the outer tapered recess of the housing, the apertures being adapted to receive the activation shaft such that when the activation shaft is rotated by the crank lever in one direction, the threading of the displacing wedge draw the wedges closer together thereby displacing the side components of the housing outwardly to the expanded state, and when the activation shaft is rotated by the crank lever in the opposite direction, the threading of the displacing wedge expands the wedges away from each other thereby contracting the side components of the housing inwardly to the contracted state, while the thrust bearing reduces normal friction during operation and use;

a pair of springs coupled to the adjacent inside faces of the side components of the housing and being adapted to reconfigure the system to its collapsed state as the displacing wedges are back off of each other; and four plastic rods of a cylindrical configuration being coupled coaxially with the contact indentations of the side components of the housing and being adapted to provide a non-marring contact surface to prevent damage to the connecting rod during operation and use.

2. A connecting rod cap separator system comprising:

a housing having a pair generally side components each with an inside face and an outside faces adapted to fit inside the circular aperture of a connecting rod;

a pair of support screws;

an activation shaft with a threading and a crank lever; and a pair displacing wedges each having a pair of sloped faces and apertures extending there through, the apertures being adapted to receive the activation shaft such that when the activation shaft is rotated by the crank lever in one direction, threading of a displacing wedge draw the wedges closer together thereby displacing the side components of the housing outwardly to an expanded state, and when the activation shaft is rotated by the crank lever in the opposite direction, threading of a displacing wedge expands the wedges away from each other thereby contracting the side components of the housing inwardly to the contracted state.

3. A connecting rod cap separator system as set forth in claim 2 and further including a pair of springs coupled to the adjacent inside faces of the side components of the housing.

4. A connecting rod cap separator system as set forth in claim 2 and further including four plastic rods of a cylindrical configuration being coupled coaxially with the contact indentations of the side components of the housing.

* * * * *